April 9, 1957  F. H. LE JEUNE  2,788,050
RIM
Filed Oct. 25, 1954  2 Sheets-Sheet 1

INVENTOR.
FRANK H. LE JEUNE.
BY

April 9, 1957 F. H. LE JEUNE 2,788,050
RIM
Filed Oct. 25, 1954 2 Sheets-Sheet 2
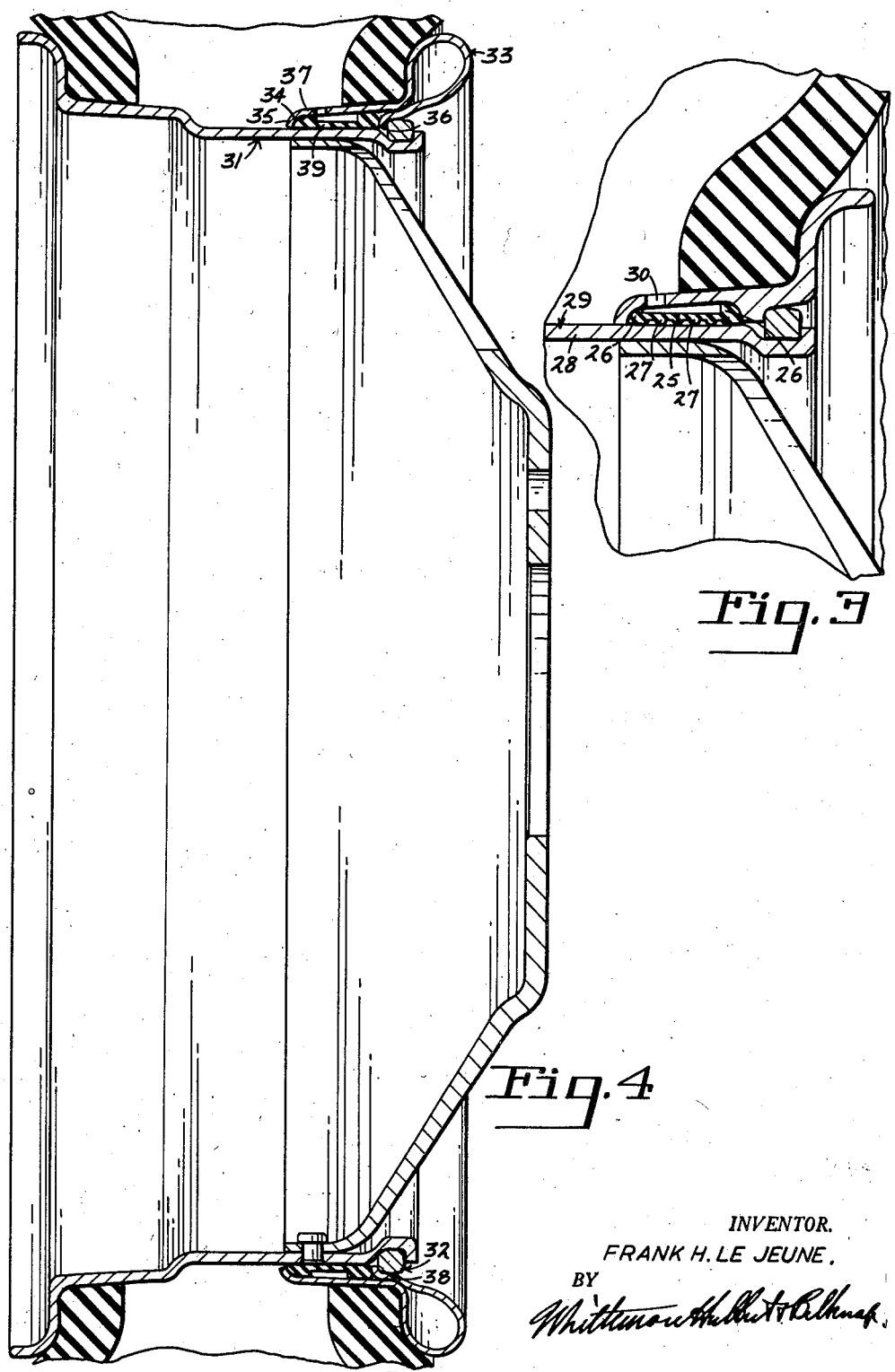
INVENTOR.
FRANK H. LE JEUNE.
BY United States Patent Office 2,788,050
Patented Apr. 9, 1957

2,788,050
RIM

Frank H. Le Jeune, Jackson, Mich., assignor to Kelsey-Hayes Company, a corporation of Delaware Application October 25, 1954, Serial No. 464,384

6 Claims. (Cl. 152—410)

The invention relates to rims and refers more particularly to rims for pneumatic tubeless tires.

The invention has for one of its objects to provide an improved rim constructed to facilitate mounting and demounting of the tubeless tire and to effectively maintain the air pressure.

The invention has for another object to provide an improved rim comprising an endless annular base member, an endless annular tire retaining member, a clamping ring member, and a sealing ring between the base and tire retaining members having an annular portion normally in sealing engagement with the base member and subject through the tire retaining member to the air pressure within the tire so that upon inflation of the tire the annular portion will be forced more firmly into sealing engagement with the base member.

The invention has for another object to mount the sealing ring on the tire retaining member and to provide the tire retaining member with an air passage for subjecting the sealing ring to the pressure of air within the tire.

With these and other objects in view, the invention will become apparent from the following description taken in connection with the accompanying drawings in which—

Figures 2 and 3 are similar views showing modifications;

Figure 4 is a similar view showing a modified rim.

Figure 2:
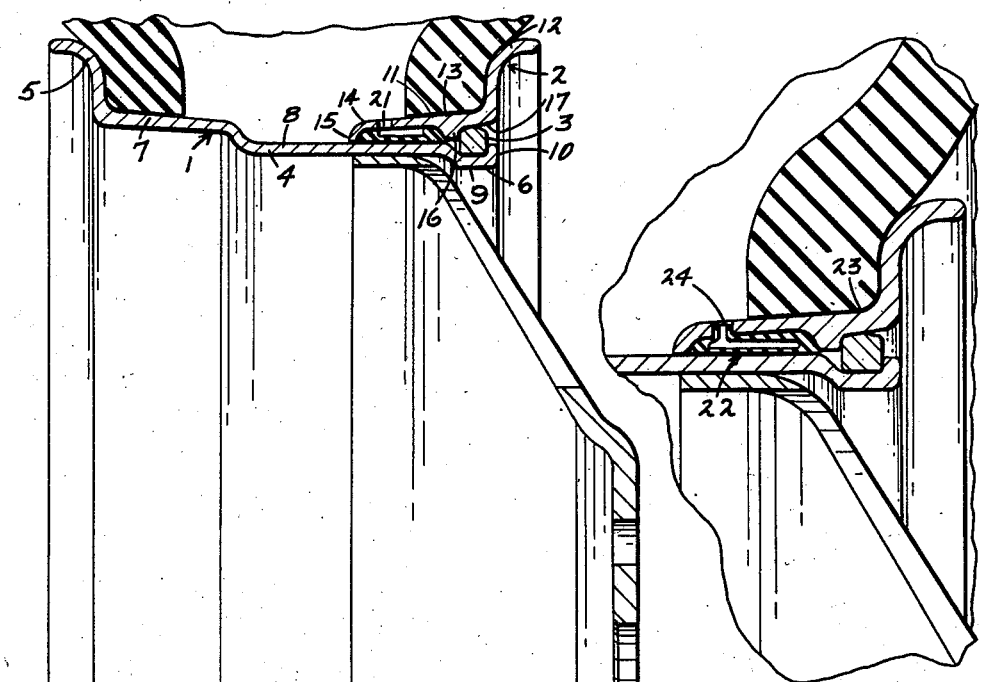

The rim is designed for use with pneumatic tubeless tires and, as illustrated, forms part of a motor vehicle wheel. In general, the rim comprises the annular base member 1, the detachable annular tire retaining member 2, and the detachable annular clamping member 3 for retaining the tire retaining member on the base member.

The base member 1 is endless and has the annular base 4, the annular tire retaining flange 5 extending generally radially outwardly from one edge of the base, and the annular gutter 6 at the other edge of the base. The base is formed with the annular tire bead seat portion 7 flared toward and connecting into the tire retaining flange 5, and the axially extending annular portion 8 leading from the bead seat portion 7 to the gutter 6. The annular portion 8 has an external diameter less than the smallest diameter of the bead seat portion 7. The bottom wall 9 of the gutter extends axially and has an external diameter less than that of the annular portion 8, and the axially outer terminal side wall 10 of the gutter has an external diameter which is preferably slightly less than the external diameter of the annular portion 8. This terminal side wall presents a substantially radial axially inwardly facing surface.

The tire retaining member 2 is endless and is movable over the side wall 10. This tire retaining member has the tire bead seat portion 11 and the integral tire retaining flange portion 12 extending generally radially outwardly from the axially outer edge of the tire bead seat portion. The tire bead seat portion is formed with the axially outwardly flared part 13 connecting into the tire retaining flange portion 12 and is also formed with the axially extending part 14 terminating in the generally radially inwardly extending annular part 15 having an internal diameter to clear the annular portion 8 of the base. The tire retaining member has the annular part 16 which is a rib spaced axially from the terminal part 15 and extending generally radially inwardly from the flared part 13 of the tire bead seat portion and presents a substantially radial axially outwardly facing shoulder. The internal diameter of the rib is greater than the external diameter of the side wall 10 and annular portion 8 of the base. The generally radially inwardly extending parts 15 and 16 form with the portion of the tire bead seat portion 11 between these ribs an annular radially inwardly opening recess. The tire retaining member also has the radially inner surface 17 which flares axially outwardly from its junction with the rib 16.

The detachable clamping member 3 is a ring transversely split at one point and in the final or completely assembled position of the rim members occupies a position between and engaging the bottom wall 9 of the gutter, the radially inner surface 17 of the tire retaining member, the terminal side wall 10 and the rib 16. The clamping member has symmetrical arranged radially outer peripheral bearing surfaces, each of which is flared toward the other, preferably at the same angle as the radially inner surface 17. The clamping member carries the radial load between the base and tire retaining members, the minimum and maximum radial sectional dimensions of the clamping member for engaging the bottom wall 9 and the radially inner surface 17 being normally greater before assembly of the rim members than the minimum and maximum radial distances respectively between the bottom wall 9 and the radially inner surface 17. During the assembling of the base, tire retaining and clamping members, the clamping member has wedging engagement with the tire retaining member and is contracted against the bottom wall of the gutter and flexes either or both the base and tire retaining members.

The beads of the tubeless tire firmly engage the flared bead seat portion 7 and the flared part 13 of the tire bead seat portion 11 and prevent the escape of air along these tire bead seat portions.

For the purpose of sealing the gap between the base member 1 and the tire retaining member 2, I have provided the sealing ring 18 in the annular recess formed by the radially inwardly extending parts 15 and 16 and the intermediate part of the bead seat portion 11. This sealing ring is an endless rubber strip having the thickened edge portions 19 bonded as by being vulcanized throughout their circumferential extents to the tire retaining member 2 so that no air can escape between the edge portions and the tire retaining member. The sealing ring also has the annular portion 20 between the edge portions and this annular portion is normally bowed radially inwardly into normal sealing engagement with the annular portion 8 of the base member. The annular portion is also subject to the pressure of air in the tire through the air passage 21 formed in the axially extending part 14 axially inwardly of the adjacent tire bead so that upon inflation of the tire, the annular portion will be flexed radially inwardly into more firm sealing engagement with the annular base portion to more effectively seal the gap between the base and the tire retaining members.

The tubeless tire may be readily mounted on the base member 1 of the rim during which time the tire retaining member 2 and the clamping member 3 are removed. The tire retaining member may then be readily moved over the base member and inserted within the axially outer bead of the tubeless tire. The construction is such that the radially inner faces of the beads of the tubeless tire tightly fit the tire bead seat portions 7 and 11 of the base and tire retaining members respectively so that air cannot escape between the beads and bead seat portions. When the tire retaining member is in an axially inward position to clear the clampnig member the clamping member may be expanded and moved over the side wall 10 of the gutter 6 into the gutter. The tire retaining member and the adjacent portion of the side wall of the tire may then be allowed to move axially outwardly or manually moved axially outwardly to occupy the preliminary inflatable position of assembly at which time the annular portion 20 of the sealing ring 18 is in sealing engagement with the annular portion 8 of the base member. The tire may then be inflated at which time pressure of the inflating air acting through the tire against the tire retaining member assures engagement of the clamping member with the terminal side wall of the gutter and moves the tire retaining member to its axially outer position over the clamping member. During this axially outward movement of the tire retaining member, the radially inner surface 17 of the tire retaining member rides over the clamping member contracting and seating the same on the bottom wall of the gutter and producing a wedging action until the axially outwardly facing shoulder formed by the rib 16 abuts the clamping member. Since the annular portion 20 of the sealing ring is subject to the pressure of air in the tire through the air passage 21, this annular portion is flexed into more firm sealing engagement with the annular portion of the base member thereby effectively sealing the gap between the tire retaining and base members.

Figure 1:
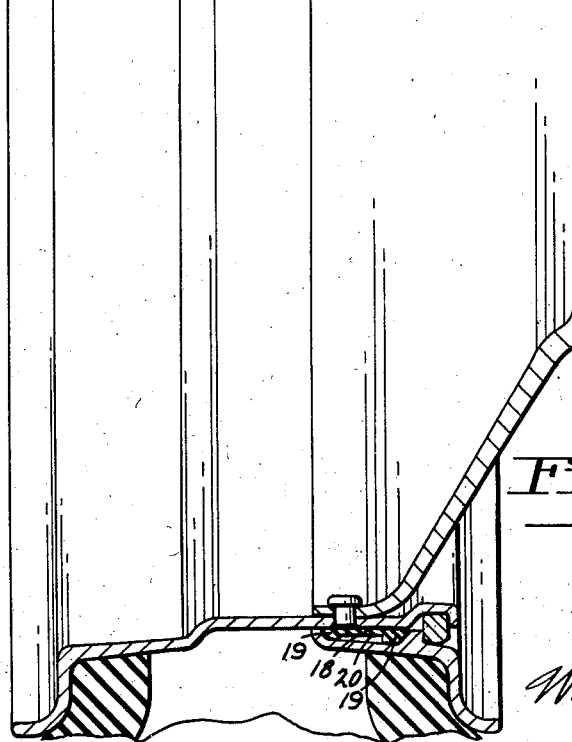
Figure 1 is an axial section through a wheel having a rim embodying the invention.

In the modification illustrated in Figure 2, the rim is of the same general construction as that illustrated in Figure 1. However, the sealing ring 22 differs in that it is formed of an endless rubber tube which is flattened to extend substantially within the radially inwardly opening annular recess of the endless tire retaining member 23. Preferably both the axially inner and axially outer edge portions of the sealing tube are secured by being cemented or vulcanized throughout their peripheries to the tire retaining member and the radially inner portion of the tube between the edge portions is normally bowed radially inward to have sealing engagement with the base member. The interior of the sealing tube is adapted to communicate with the interior of the tire through the tube 24 which extends through an opening in the axially extending part of the tire retaining member axially inwardly of the adjacent tire bead. The tube 24 is preferably formed of rubber vulcanized to the sealing tube 22.

The modification illustrated in Figure 3 is the same as that illustrated in Figure 1 with the exception that the annular portion 25 of the rubber sealing strip between its thickened edge portions 26 is formed with the radially inwardly extending annular beads 27. These annular beads normally have sealing engagement with the annular portion 28 of the rim base 29 and are adapted to be pressed more firmly into sealing engagement with this annular portion upon inflation of the tire since the pressure of air within the tire is transmitted through the air passage 30 in the tire retaining member to the radially outer side of the flexible annular portion 25.

Figure 4 illustrates another construction of rim in which the base and clamping members 31 and 32 respectively are the same as those previously described and the tire retaining member 33 differs in being formed of strip stock instead of mill section. In this case, the tire retaining member 33 has the edge portions of the radially inwardly opening annular recess 34 formed by the terminal generally radially inwardly extending annular parts 35 and 36 respectively at the free edges of the axially extending part 37 and axially outwardly flared part 38. The gap between the base and tire retaining members may be sealed by either of the sealing rings previously described, the sealing ring 39 as shown being of the same construction and functioning in the same manner as the beaded sealing ring of Figure 3.

What I claim as my invention is:

1. A rim for a pneumatic tubeless tire comprising an endless annular base member having a generally radially outwardly extending wall, a detachable endless annular tire retaining member movable over said wall and encircling said base member, a clamping ring member movable over said wall to a position between and engaging said base and tire retaining members, and a sealing ring carried by said tire retaining member, said sealing ring having axially spaced annular portions in sealing engagement with said tire retaining member and an intermediate flexible annular portion encircling and normally in sealing engagement with said base member and subject to the air pressure within the tire acting to force said intermediate annular portion into more firm sealing engagement with said base member.

2. A rim for a pneumatic tubeless tire comprising an endless annular base member having an annular gutter at one edge, a detachable endless annular tire retaining member movable over said base member and having an annular tire bead seat portion extending over and encircling said base member, said bead seat portion being provided with a generally radially inwardly extending terminal part and with a generally radially inwardly extending part spaced axially from said first mentioned generally radially inwardly extending part, a transversely split clamping ring member extending within said gutter and located between said base member and tire retaining member and abutting said second mentioned part, and a sealing ring located in the space between said first and second mentioned generally radially inwardly extending parts and having annular edge portions in sealing engagement with said bead seat portion, said sealing ring having an annular intermediate portion normally in sealing engagement with said base member and subject to the air pressure within the tire and flexible into more firm sealing engagement with said base member.

3. A rim for a pneumatic tubeless tire comprising an endless annular base member, a detachable endless annular tire retaining member movable over said base member and having a radially inwardly opening annular recess, a clamping ring member on said base member for limiting axial movement in one direction of said tire retaining member relative to said base member, and a sealing ring located in the recess and having axially spaced annular portions in sealing engagement with said tire retaining member, said sealing ring having an annular resilient portion between said first mentioned annular portions normally in sealing engagement with said base member and subject to the air pressure within the tire for flexing said annular resilient portion into more firm sealing engagement with said base member.

4. A rim for a pneumatic tubeless tire comprising an endless annular base member, a detachable endless annular tire retaining member movable over said base member and having an annular tire bead seat portion extending over and encircling said base member, said bead seat portion being provided with a radially inwardly opening annular recess and with an air passage for placing the interior of the tire in communication with the recess, a clamping ring member on said base member for limiting axial movement in one direction of said tire retaining member relative to said base member, and a sealing ring located in the recess and formed of a resilient strip having edge portions secured to said bead seat portion in annular sealing engagement therewith and an intermediate portion normally in sealing engagement with said base member, said intermediate portion being flexible by the air which passes through the air passage from the interior of the tire into more firm sealing engagement with said base member.

5. A rim for a pneumatic tubeless tire comprising an endless annular base member, a detachable endless annular tire retaining member movable over said base member and having an annular tire bead seat portion extending over and encircling said base member, said bead seat portion being provided with a radially inwardly opening annular recess and with an air passage for placing the interior of the tire in communication with the recess, a clamping ring member on said base member for limiting axial movement in one direction of said tire retaining member relative to said base member, and a sealing ring formed of an annular rubber strip located in the recess and having edge portions bonded to said bead seat portion and an intermediate portion formed with an annular radially inwardly extending rib normally in sealing engagement with said base member, said intermediate portion being subject to the pressure of the air within the tire and flexible to move said rib into more firm sealing engagement with said base member.

6. A rim for a pneumatic tubeless tire comprising an endless annular base member, a detachable endless tire retaining member movable over said base member and having a tire bead seat portion extending over and encircling said base member and provided with a radially inwardly opening annular recess, a clamping ring member on said base member for limiting axial movement in one direction of said tire retaining member relative to said base member, a sealing ring formed of an endless rubber tube located in the recess and communicating with the interior of the tire through said tire bead seat portion, said rubber tube having annular sealing engagement with said tire bead seat portion and having an annular portion normally in sealing engagement with said base member and flexible by the air within said rubber tube into more firm sealing engagement with said base member.

References Cited in the file of this patent

UNITED STATES PATENTS

| | | |
|---|---|---|
| 2,468,947 | Sinclair | May 3, 1949 |
| 2,685,907 | Waddell | Aug. 10, 1954 |